2,856,377
POLYTRIFLUOROCHLOROETHYLENE COMPOSITIONS

Otto Fuchs, Frankfurt, Siegfried Sommer, Frankfurt am Main, and Hans Hoyer, Gersthofen, Kreis Augsburg, Germany, assignors to Farbwerke Hoechst Aktiengesellschaft vormals Meister Lucius & Brüning, Frankfurt (Main)-Hoechst, Germany, a company of Germany No Drawing. Application May 26, 1953,
Serial No. 357,626

5 Claims. (Cl. 260—29.8)

The present invention relates to compositions of matter containing polytrifluoro-chlorethylene.

Polytrifluoro-chlorethylene is distinguished from other synthetic highly polymerized substances insofar as its softening point is very high (240° C. and more) and the solubility in inorganic or organic substances is very low. Both properties are of great advantage, when the polymer is used in practice, on the other hand, the shaping is impeded thereby (for example, when foils, threads, or the like are made). Accordingly, an urgent need exists for finding any useful solvents and swelling agents of not too high a boiling point.

Up to now some compounds simultaneously containing fluorine and chlorine have proved to be useful solvents. These substances have, however, the drawback of being very expensive and, on moulding the polymer, they can only partially be recovered. It is, therefore, still necessary to look for industrially accessible solvents and swelling agents which can be used either as such or in admixture with the expensive solvents.

Now, we have found that hydroaromatic hydrocarbons of the group consisting of dipentene, dicyclopentadiene, pinene, camphene, vinyl cyclohexene and methyl cyclohexene constitute useful swelling agents and diluents or plasticizers for polytrifluoro-chloroethylene. The pastes and solutions obtained therewith, if required, while simultaneously using other solvents, can be further treated in a simple manner, so that coatings, ribbons, or the like are produced.

In the following examples a polytrifluoro-chlorethylene is used as a starting material whose molecular weight, according to the "NST"—and osmotic values given by Kaufman and Mathana (see "J. Polymer. Science," 1951, vol. 6, page 251) amounts to about 75.000. In the examples the polytrifluoro-chlorethylene is used, in general, in a concentration of about 3 percent. The action of the swelling agents and plasticizers sets in just as well, when higher or lower concentrations, for example about 2 percent to about 10 percent, or other molecular weights of the polymer are applied.

The following examples serve to illustrate the invention but they are not intended to limit it thereto.

EXAMPLE 1

Table 1 shows the solubility behaviour of the polytrifluorochlorethylene in mixtures of dipentene and 1,2,3-trifluoropentachloropropane (mixing proportion in parts by volume):

Table 1

| Dipentene | $CFCl_2$—$CFCl$—$CFCl_2$ | Temperature applied for dissolution, ° C. |
|---|---|---|
| 1 | 1 | 140 |
| 2 | 1 | 145 |
| 3 | 1 | 155 |
| 9 | 1 | 165 |

Dipentene, when mixed with ortho-chlorobenzo-trifluoride, shows a similar behaviour.

EXAMPLE 2

If the same mixing proportions as those named in Example 1 are applied, the dissolving temperatures amount to 140° C.–150° C. when the petroleum fraction designated as naphtha is used.

EXAMPLE 3

Table 2 shows the solubility behaviour of polytrifluoro-chlorethylene in mixtures of dicyclopentadiene and ortho-chlorobenzotrifluoride.

Table 2

| Dicyclopentadiene | ortho-chlor-benzotri-fluoride | Temperature applied for dissolution, ° C. |
|---|---|---|
| 1 | 1 | 130 |
| 2 | 1 | 140 |
| 9 | 1 | 150 |

EXAMPLE 4

The temperatures applied for dissolving polytrifluorochloroethylene in mixtures of beta-pinene and ortho-chlorobenzotrifluoride are given in Table 3.

Table 3

| beta-pinene | ortho-chlor-benzo-tri-fluoride | Temperature applied for dissolution, ° C. |
|---|---|---|
| 1 | 1 | 130 |
| 3 | 1 | 140 |

It can be derived from Table 4 hereafter that the hydroaromatic hydrocarbons named show good swelling properties when they are caused to react with polytrifluoro-chlorethylene.

Table 4

| Swelling agent | Beginning of the swelling, ° C. | Strong swelling, ° C. |
|---|---|---|
| beta-pinene | 130 | 140–150 |
| camphene | 130 | 140–145 |
| vinyl-cyclohexene | 100 | 110–120 |
| dipentene | 125 | 140–145 |

Substances such as vinyl-cyclohexene, methyl-cyclohexene, camphene, phellandrene, terpinolene, methyl-cyclohexadiene and others have a behaviour similar to that of the hydrocarbons named in the 4 preceding examples.

Substances of the same kind may also serve as plasticizers for shaped bodies made of polytrifluoro-chlorethylene, but the boiling point must amount to suitably at least about 300° C. when normal pressure is applied. For example, from polytrifluoro-chlorethylene and diterpenes films are obtained which are soft and flexible, contrary to hard films which do not contain any plasticizers.

It is, furthermore, suitable if the substances named contain at least a C=C-bond for six carbon atoms each.

We claim:

1. Compositions of matter containing polytrifluorochloroethylene and from 2 to 10 percent of a hydroaromatic hydrocarbon selected from the group consisting of dipentene, dicyclopentadiene, pinene, camphene, vinyl cyclohexene and methylhexene.

2. Compositions of matter containing polytrifluorochloroethylene and from 2 to 10 percent beta-pinene.

3. Compositions of matter containing polytrifluorochloroethylene and from 2 to 10 percent camphene.

4. Compositions of matter containing polytrifluorochloroethylene and from 2 to 10 percent vinyl-cyclohexene.

5. Compositions of matter containing polytrifluorochlorethylene and from 2 to 10 percent dipentene.

References Cited in the file of this patent
UNITED STATES PATENTS

| | | |
|---|---|---|
| 2,542,070 | Sprung | Feb. 20, 1951 |
| 2,718,511 | Sprung et al. | Sept. 20, 1955 |